US012142821B2

(12) United States Patent
Zachara et al.

(10) Patent No.: US 12,142,821 B2
(45) Date of Patent: Nov. 12, 2024

(54) COMPACT DETUNE-RESILIENT WIRELESS DEVICE WITH TOUCH-SENSITIVE INTERFACE

(71) Applicant: Shure Acquisition Holdings, Inc., Niles, IL (US)

(72) Inventors: Christopher Zachara, Williamsburg, VA (US); Michael Le, Niles, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 190 days.

(21) Appl. No.: 18/086,267

(22) Filed: Dec. 21, 2022

(65) Prior Publication Data

US 2024/0213658 A1 Jun. 27, 2024

(51) Int. Cl.

*H01Q 1/48* (2006.01)
*H01P 1/24* (2006.01)
*H01Q 1/22* (2006.01)
*H01Q 1/27* (2006.01)
*H01Q 9/04* (2006.01)

(52) U.S. Cl.

CPC ............... *H01Q 1/273* (2013.01); *H01P 1/24* (2013.01); *H01Q 1/2291* (2013.01); *H01Q 1/48* (2013.01); *H01Q 9/0421* (2013.01)

(58) Field of Classification Search

CPC ........ H01Q 1/273; H01Q 1/2291; H01Q 1/48; H01Q 9/0421

See application file for complete search history.

(56) References Cited

U.S. PATENT DOCUMENTS

| | | | |
|---|---|---|---|
| 10,129,635 | B1 | 11/2018 | Zhu et al. |
| 10,244,303 | B2 | 3/2019 | Xu et al. |
| 10,356,505 | B2 | 7/2019 | Rabb et al. |
| 2001/0050635 | A1 | 12/2001 | Weinberger |
| 2009/0146888 | A1 | 6/2009 | Wu |
| 2020/0045422 | A1 | 2/2020 | Chiang et al. |

FOREIGN PATENT DOCUMENTS

| | | | |
|---|---|---|---|
| CN | 205178002 | U | 4/2016 |
| CN | 206379458 | U | 8/2017 |
| CN | 208273204 | U | 12/2018 |
| CN | 208691472 | U | 4/2019 |
| CN | 209056590 | U | 7/2019 |
| CN | 110165409 | A | 8/2019 |
| CN | 209418753 | U | 9/2019 |
| CN | 209747717 | U | 12/2019 |
| CN | 111031430 | A | 4/2020 |
| JP | 2007006074 | A | 1/2007 |

*Primary Examiner* — Graham P Smith

(74) *Attorney, Agent, or Firm* — Banner & Witcoff, Ltd.

(57) ABSTRACT

Systems, apparatuses, and methods are described for increasing a performance of a small wireless device comprising one or more conductive elements electrically coupled with an antenna. A user interface element of the wireless device may be configured to operate as a radiative component of an antenna structure. A power source element may be electrically isolated from a ground, resulting in decreased coupling with the antenna. Moreover, an antenna bandwidth may be increased, via modification of one or more antenna characteristics and/or the addition of one or more novel antenna components, in order to increase the detune-resiliency of the antenna. In addition, the radio frequency performance and reliability of the wireless device may be improved by maintaining fixed positioning between various components of the wireless device. Thus, the antenna and the one or more conductive elements may be configured to increase the device performance.

20 Claims, 14 Drawing Sheets

COMPACT DETUNE-RESILIENT WIRELESS DEVICE WITH TOUCH-SENSITIVE INTERFACE

BACKGROUND

Electrical and conductive components of compact or otherwise portable wireless devices may be located within a very limited volume of space, such as within a small housing. Due to limited available space, these components may need to be placed very close to one another, potentially causing undesirable electrical coupling to occur between these components and resulting in sub-optimal device performance. For example, a grounded battery component may electrically couple with an antenna of a small wireless device that has touch-sensitive input, and thereby decrease the radiated efficiency of the antenna. Furthermore, a touch sensing component may electrically couple with the antenna in an unpredictable or uncontrolled manner when a user interacts with the touch sensing component, thereby potentially decreasing the radiated efficiency of the antenna in a likewise unpredictable or uncontrolled manner. A decrease in radiated efficiency, and particularly an unpredictable decrease in radiated efficiency, may result in sub-optimal device performance. Another cause of sub-optimal device performance is low antenna resilience to detuning based on a narrow antenna bandwidth. For example, it is not uncommon for wireless devices to experience a radio frequency performance variance of 10 dB or more within a device due to detuning from user interactions with the device and/or amongst devices due to relatively wide manufacturing tolerances such as in separation distances between electrically conductive components of the device. When a device is compact, small variances in separation distances can have outsize effects on the performance of the device's radio frequency antenna.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

According to some aspects as described herein, a wireless device may be provided having an antenna with a relatively wider transmission and/or reception bandwidth and a relatively higher resilience to certain causes of detuning. Moreover, judicious placement and configuration of one or more other electrically conductive elements of the wireless device may help to increase the antenna's resiliency to detuning and improve overall performance of the wireless device. This may involve, for example, configuring the wireless device such that various components of the wireless device each have a predictable and fixed location and/or orientation with respect to one or more other components of the wireless device. For example, a spacer may be included in the wireless device that forces the various components into particular predetermined locations and/or orientations within the wireless devices. The spacer may be, for example, a molded or three-dimensionally printed element that is relatively stiff and that is shaped to conform to one or more of the components. Moreover, the spacer may be precisely manufactured to have a shape that defines one or more regions configured (e.g., appropriately shaped three-dimensional spaces within the wireless device) to retain one or more components of the wireless device at relative locations and/or orientations that may be reliably repeatable within small tolerances during manufacture of a large number of wireless devices. For example, using such a spacer, it may be expected that compact wireless audio devices (such as in-ear earphones) using such a spacer may have a small device-to-device variance of antenna performance. The spacer may be considered a frame, which may be integral to or connected to an external housing of the wireless device. For example, the spacer may be an inward extension of an external housing, or the spacer may be a separate element connected to the housing such as via one or more screws or other fasteners.

According to further aspects as described herein, systems, apparatuses, and methods are described for providing high performance of a wireless device having an antenna and one or more electrically conductive elements located in close proximity with the antenna. For example, due to the compact form factor of some wireless devices, a power source element of the wireless device, such as coin rechargeable battery or other type of battery, may need to be placed in close proximity with the antenna of the wireless device. The power source element may be electrically connected to a ground via an impedance network with a maximum impedance at an operating frequency of the antenna, resulting in the power source element being electrically isolated at the operating frequency of the antenna. Furthermore, a backend of the antenna may be tapered to increase a distance between the antenna and the power source element. Thus, electrical coupling between the antenna and the power source element may be decreased, potentially resulting in an increased performance of the wireless device.

According to further aspects as described herein, a touch sensor of a wireless device may be configured to function as a ground plane in close proximity with the antenna. For example, the touch sensor may be grounded via a direct electrical connection with a ground plane. The touch sensor and the antenna may together radiate electromagnetic energy as an effective antenna. Thus, instead of undesirably detuning the antenna, the touch sensor may be configured to operate as an intended radiating component of the antenna. Thus, the antenna may be designed with the touch sensor as a portion of the antenna, such that the entire antenna has the desired radiative properties for transmitting and/or receiving radio frequency energy. Moreover, to further increase antenna performance of the wireless device, a backend of the touch sensor may be tapered to reduce blocking, by the touch sensor, of electromagnetic fields radiated by the antenna.

These features, along with many others, are discussed in greater detail below.

BRIEF DESCRIPTION OF THE DRAWINGS

The present disclosure is described by way of example and not limited in the accompanying figures in which like reference numerals indicate similar elements.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

Figure 1:
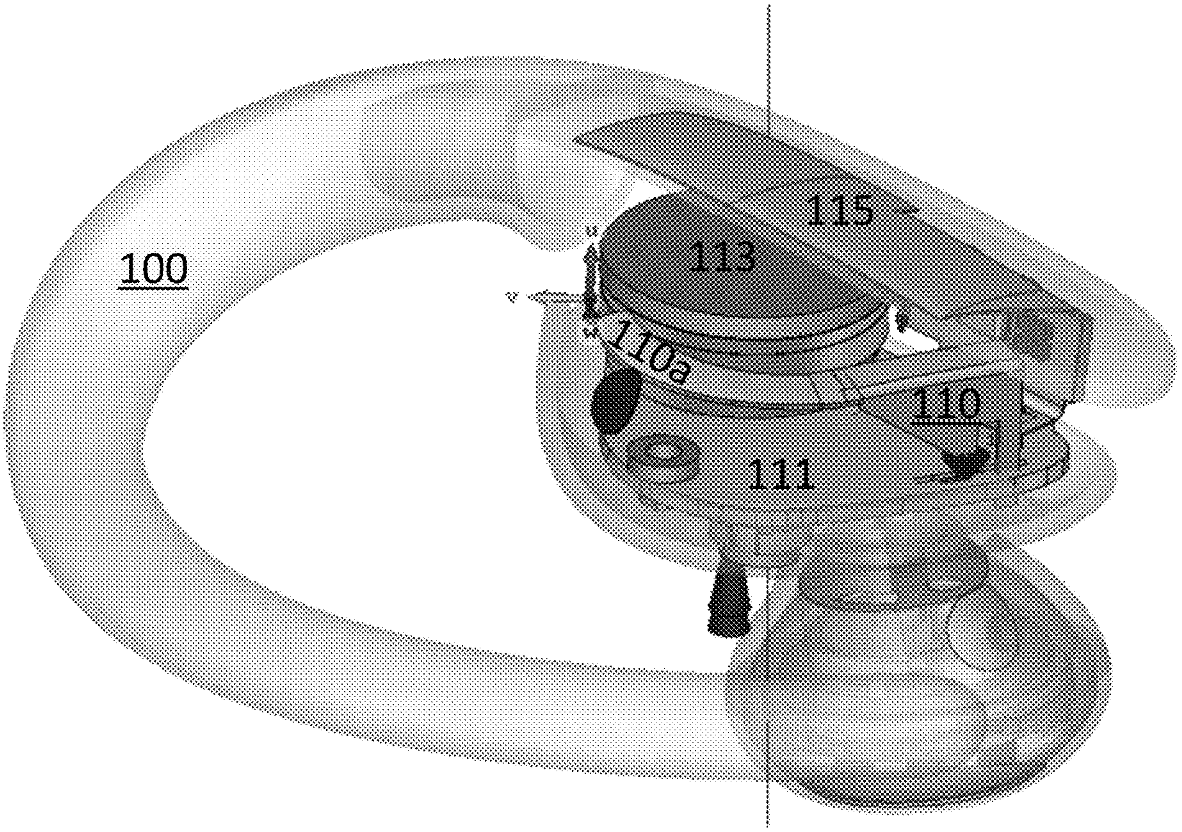
FIG. 1 shows an example arrangement of components of a wireless device in which one or more aspects described herein may be implemented.

FIG. 1 shows an example arrangement of components of a wireless device 100. By way of example, the wireless device 100 is depicted in FIG. 1 as an earbud-type earphone device. However, the wireless device 100 may be, for example, any type of wireless audio device (e.g., another type of earphone device, a headphone device, a stereo personal monitor, a Bluetooth microphone device, a hearing aid, or any other wearable or non-wearable device capable of wirelessly transmitting and/or receiving audio signals using one or more antennas) having at least one speaker and/or at least one microphone. The wireless device 100 may have circuitry (e.g., one or more processors, transistors, capacitors, resistors, diodes, conductive interconnections, etc.) that is configured to receive audio signals from at least one microphone and/or to send audio signals to at least one speaker, and to send and/or receive signals via one or more antennas represented by way of example herein as antenna 110 (e.g., one or more metal plate antennas, microstrip antennas, inverted F antennas, L-shaped antennas, bowtie antennas, printed-circuit-board (PCB) board antennas, and/or any other type of antenna that is affixable to and/or disposed within a wearable wireless device such as the wireless device 100). The antenna 110 may be configured for reception only, for transmission only, or for both reception and transmission of radio frequency signals. A feedline for antenna 110 may send and/or receive radio-frequency signals to and/or from one or more other components of the wireless device 100, and send and/or receive those signals to and/or from the antenna 110 for transmission and/or reception of the signals via electromagnetic radiation.

In particular, FIG. 1 shows an example of the antenna 110 as a modified planar inverted F antenna (hereinafter a “PIFA antenna”). The antenna 110 may, for example, be a Bluetooth antenna configured to send and/or receive signals via one or more carrier frequencies (e.g., frequencies between 2.4 and 2.484 gigahertz, hereinafter “GHz”). Furthermore, the antenna 110 may comprise an electrically conductive (e.g., metal) segment 110*a* that may be curvilinear (e.g., a helix segment) and that may follow (e.g., may be parallel with) an edge of an electrically conductive (e.g., metal) ground plane 111 of the wireless device 100. For example, an edge of the segment 110*a* may stay a fixed distance from the edge of the ground plane 111, remain within a maximum distance from the edge of the ground plane 111, and/or generally have an edge that follows the shape of the edge of the ground plane 111. Non-limiting examples of the fixed distance or maximum distance may be a value in the range of 2 millimeters to 5 millimeters, or in any other range or of any other value.

The segment 110*a* of the antenna 110 may comprise one or more portions that may be straight or curved and that may form the shape of, for example, a helix segment, a partial circle, a piecewise combination of curved portions, and/or a piecewise combination of curved and straight portions. Furthermore, the segment 110*a* of the antenna 110 may terminate in a back end which, as explained below, may have a slanted edge. The slanted edge may extend the physical length of the antenna 110 and may allow a desired in-band antenna resonance given (and despite) limited design space constraints inherent to smaller (e.g., wearable) devices (e.g. Bluetooth headphones or other types of earphone or headphone devices). Furthermore, the slanted edge may reduce (e.g., minimize) detuning of the antenna 110 that might otherwise be caused by proximity with a power source 113 (e.g., a battery). Additional example details of the antenna 110 are discussed below in connection with FIG. 2.

The wireless device 100 may receive user input via a user-interactive element 115. The user-interactive element 115 may be, for example, a touch sensor (for example, a capacitive touch sensor) comprising one or more touch sensing surfaces (for example, one or more touch-sensitive pads) configured to detect one or more types of user-interactions such as a user’s finger pressing on the user-interactive element 115, a user’s finger tapping on the user-interactive element 115, and/or a user’s finger sliding across the user-interactive element 115. A user may interact with the user-interactive element 115 to operate one or more features of the wireless device 101. For example, user interactions with the user-interactive element 115 may cause the wireless device 101 to perform one or more functions associated with power cycling (e.g., device on, device off, device restart), volume adjustment, playing or pausing of music, noise cancelation, initiating a call, accepting a call, ending a call, device wireless pairing, device configuration, and/or any other features associated with wireless devices.

A portion of the wireless device 100 may be configured to radiate and/or receive electromagnetic energy. For example, the wireless device 100 may be configured to send and/or receive signals via an effective antenna comprising the antenna 110, the ground plane 111, and the user-interactive element 115. The user-interactive element 115 may be electrically grounded via an electrical connection with the ground plane 111. Thus, the antenna 110 and the grounded user-interactive element 115 may together effectively radiate as a center-fed V-shaped antenna. Moreover, user interactions with the user-interactive element 115 may have minimal effect on the performance of the wireless device 100, or in some cases may improve the "ground-leg" of the V-shaped antenna, and consequently improve performance of wireless device.

The wireless device 100 may further comprise the power source 113 (e.g., a battery such as a disposable battery, a rechargeable battery, etc.). For example, any of the functions and/or features discussed above may be performed based on power supplied from the power source 113 to the circuitry of the wireless device 100. The power source 113 may be in close proximity with an end of the segment 110*a* of the antenna 110. A close proximity between the power source 114 and the segment 110*a* may result in sub-optimal performance of the wireless device 100. However, and as discussed below in connection with FIG. 4, an end of the segment 110*a* may be slanted (e.g., tapered) to maximize a separation distance between the segment 110*a* and the power source 113. Maximizing the separation distance between the segment 110*a* and the power source 113 may result in improved performance of the wireless device 100.

Figure 2A:
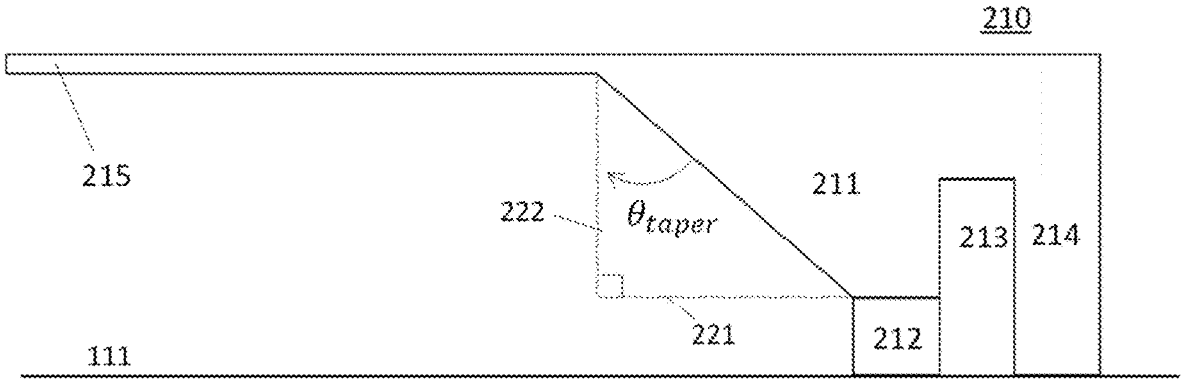
FIGS. 2A, 2B, and 2C show perspectives of an example modified PIFA antenna in accordance with one or more aspects of the disclosure.
Figure 2B:
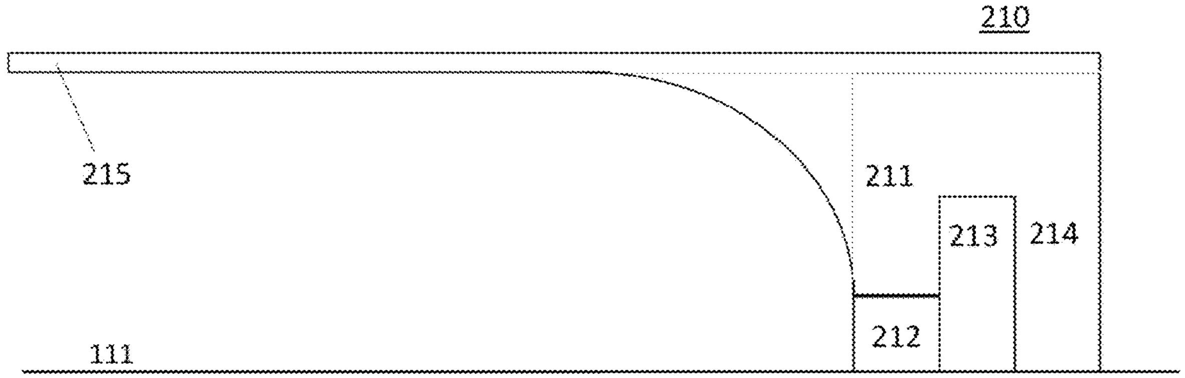
Figure 2C:
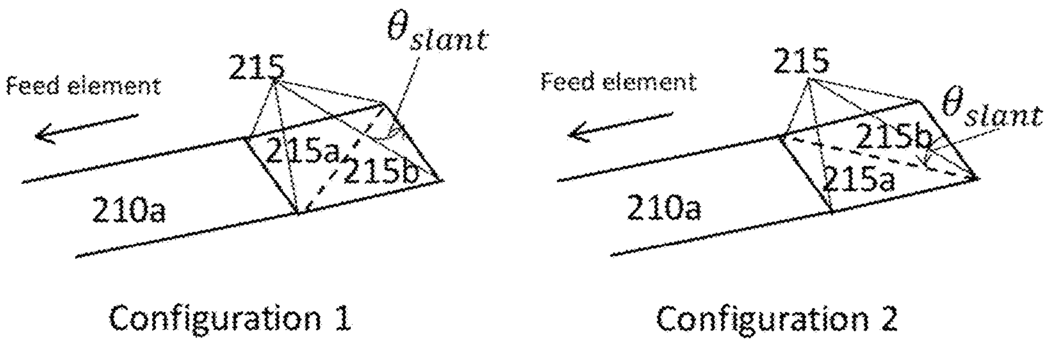

FIGS. 2A, 2B, and 2C show perspectives of an example modified PIFA antenna 210 which may be an implementation of the antenna 110 of the wireless device 100. The modified PIFA antenna 210 may be electrically connected to the ground plane 111 via a grounding tab 214. By way of example, FIG. 2A shows a side view of modified PIFA antenna 210 comprising a broadband antenna feed element 211, a radio-frequency (RF) feed 212, an impedance matching slot 213, the grounding tab 214 electrically connecting the antenna 210 to the grounding plane 111, and a backend 215. The feed element 211 may comprise, for example, sheet metal and/or other electrically conductive materials. The feed element 211 may be printed on a substrate such as a PCB substrate (which may support and/or be in direct physical contact with the ground plane 111). The feed element 211 may be tapered to have a particular width near the RF feed 212 and become progressively wider as it extends away from (in the upward direction in FIG. 2A) the RF feed 212 and away from the ground plane 111. The tapering of the feed element 211 may be a linear tapering (such as shown in FIG. 2A), a curvilinear tapering (such as shown in FIG. 2B), or of any other tapered configuration. For example, a subslantially linear tapering of the feed element 211 may correspond to a right triangle formed from an imaginary dashed line 221 (shown in FIG. 2A) oriented perpendicularly to another imaginary dashed line 222 (shown in FIG. 2A) and may have the shown taper angle $\theta_{taper}$. The tapering of the feed element 211 is shown in the figures as extending from the top of the RF feed 212, however the tapering of the feed element 211 may begin lower down (e.g., such that some or all of the RF feed 212 is also tapered) or higher up (e.g., only a portion of the feed element 211 is tapered). For example, at least half of the vertical extent of the feed element 211 may be tapered.

The taper angle $\theta_{taper}$ may comprise any value greater than 0° and less than 90°. Tapering (e.g., where $\theta_{taper} \approx 45°$) of a feed element such as the feed element 211 may improve antenna 210 radiation bandwidth, which ultimately may improve detuning resiliency and may consequently preserve antenna in-band radiated efficiency as compared with a non-tapered or less tapered version of the antenna. Using computer simulation and/or physical testing, a desired (e.g., optimal) tapering angle and/or tapering configuration of the feed element 211 may be determined for a given antenna implementation that may result in a desired (e.g., maximum) in-band bandwidth during user interactions. For example, in some antenna configurations, a tapering of $\theta_{taper} \approx 45$ may provide an approximately 15% increase of bandwidth compared with no tapering (e.g., $\theta_{taper}=0°$). Moreover, in some antenna configurations, a tapering of $\theta_{taper} \approx 80$ may provide an approximately 34.5% increase of bandwidth compared with no tapering. The tapering angle of approximately 45 degrees is merely one example, the tapering angle may be of another value, such as in the range of 15-30 degrees, in the range of 30-60 degrees, in the range of 15-60 degrees, or within any other range or of any other value. The particular optimal tapering angle may depend upon other configuration parameters of the antenna, and may be found using simulation and/or testing of the antenna to determine the optimal or other desired tapering angle that produces the desired amount (e.g., maximum amount) of in-band bandwidth of the antenna during user interactions. Indeed, an optimal or desirable tapering angle may be simulated, calculated, and/or tested for a particular desired antenna arrangement, and may depend on one or more characteristics such as a PIFA antenna height above ground 111, a width of radiating portions of the modified PIFA antenna, and the location of electronic components with respect to the PIFA antenna. Where the tapering of the feed element 211 is curvilinear or otherwise not completely linear, then the tapering angle $\theta_{taper}$ may be considered the angle of the hypotenuse of a right triangle, where the two perpendicular sides of the right triangle are the horizontal full extent of the tapering (e.g., broken line 221) and the vertical full extent of the tapering (e.g., broken line 222).

Moreover, the modified PIFA antenna 210 (e.g., as shown in FIGS. 2A-2C and described below in more detail) may provide a greater bandwidth than a typical PIFA antenna. For example, where the modified PIFA antenna 210 has an operating center frequency of 2.44 GHz and no taper (e.g., $\theta_{taper}=0°$), the modified PIFA antenna 210 may comprise an operating bandwidth of approximately 768 MHz. However, a typical PIFA antenna with an operating center frequency of 2.44 GHz and no taper may comprise a bandwidth of approximately 565 MHz. Furthermore, the bandwidth of the modified PIFA antenna 210 may be further increased by increasing the taper angle $\theta_{taper}$ (e.g., a bandwidth of approximately 883 MHz for $\theta_{taper}=45°$. While the actual bandwidths may depend upon particular antenna configurations, an example of how antenna bandwidth may be increased by increasing taper angle is shown below in Table 1. While a 45 degree taper angle is shown in Table 1, other taper angles may be used that are greater than zero degrees, such as but not limited to a taper angle that is 15 degrees or greater, or 45 degrees or greater, or between 15 degrees and 45 degrees.

TABLE 1

| taper angle ($\theta_{taper}$) | 3 db radiated power antenna bandwidth | % bandwidth increase over standard PIFA antenna with a bandwidth of 565 MHz |
|---|---|---|
| 0 degrees | 768 MHz | 36% |
| 45 degrees | 883 MHz | 56% |

FIG. 2B shows a perspective view of the modified PIFA antenna 210 depicted in FIG. 2A, except that the tapering of the feed element 211 is curvilinear in this example rather than linear. The feed element 211 may conform to any linear or curvilinear shape (e.g., straight lines, curved lines, and/or a piecewise combination of straight and curved lines). Furthermore, an antenna total bandwidth (matching and radiation) may be modified (increased) based on the shape of the feed element 211. This tapered configuration of the feed element 211 may increase antenna operating bandwidth and consequently reduce antenna detuning by, e.g., human hands/fingers, and may consequently increase the transmission and/or reception efficiency of the antenna 210 as compared with a non-tapered or less tapered version of the antenna 210. Using computer simulation and/or physical testing, a desired (e.g., optimal) tapering angle and/or tapering configuration of the feed element 211 may be determined for a given antenna implementation that may result in a desired (e.g., maximum) bandwidth given normal user interactions with the wireless device and antenna defining effects.

The antenna 210 may be mechanically supported, such as on the ground plane 111, via the feed element 211. For example, the antenna backend 215 may be supported by the tapered configuration of the feed element 211 (e.g., an analogously supported structure may be a stone arch bridge). The tapered feed element 211 may, if desired, provide an alternative to a dedicated mechanical holder for mechanically supporting the antenna 210.

FIG. 2C shows an example backend 215 of the antenna 210 comprising multiple actual and/or hypothetical regions in accordance with an example Configuration 1 and an example Configuration 2. Configurations 1 and 2 show alternative example ways in which a backend region 215 may be configured in accordance with one or more of such regions. For example, Configuration 1 may correspond to the backend region 215 comprising region 215*a* as a physical region that includes a portion of the antenna segment 210*a*, and region 215*b* as a hypothetical (non-existent) region that does not include any portion of the antenna segment 210*a*. Configuration 2 may correspond to the backend region 215 comprising region 215*a* as a hypothetical (non-existent) region that does not include any portion of the antenna segment 210*a*, and region 215*b* as a physical region that includes a portion of the antenna segment 210*a*. A tapered backend 215 may comprise the backend region 215 configured according to either Configuration 1 or Configuration 2 and without the region 215*b*.

The backend region 215*a* may comprise a shape and area based on a slant angle $\theta_{slant}$. Thus, the configuration of the backend region 215 may be based on the slant angle $\theta_{slant}$. For example, there may be an optimal slant angle $\theta_{slant}$ for the modified PIFA antenna that maximizes the antenna detuning resiliency and preserve in-band operating bandwidth. The optimal (or other desired) slant angle may be determined based on a design tradeoff between increasing the slant angle in order to increase resilience to user interaction detuning and avoiding large slant angles that may result in an increased antenna length and decreased overall bandwidth.

Figure 3:
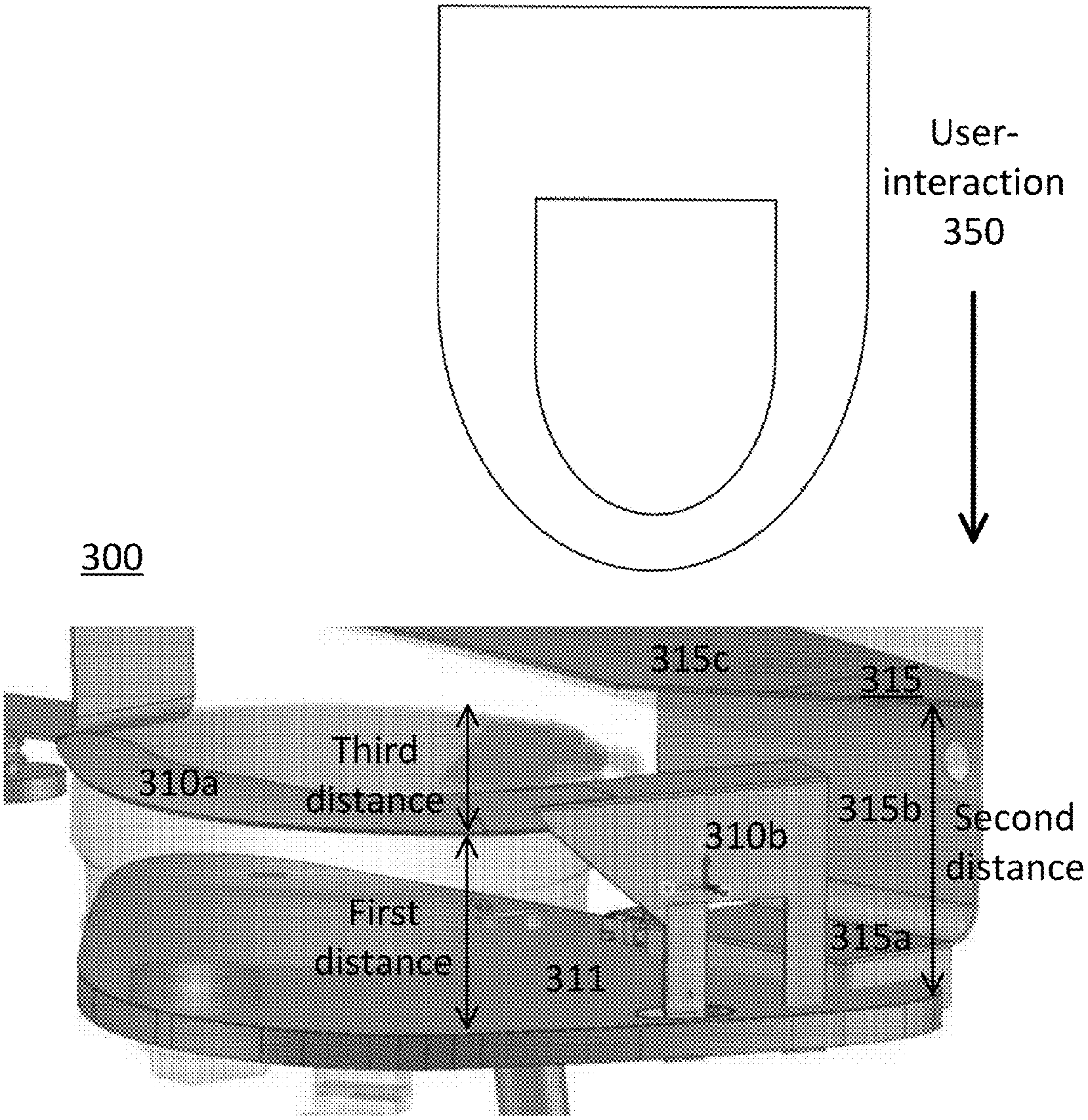
FIG. 3 shows a perspective view of an example arrangement of components of a wireless device in accordance with one or more aspects of the disclosure.

FIG. 3 shows a perspective view of a portion of an example arrangement of components of a wireless device 300 (e.g., which may be an implementation of the wireless device 100) in accordance with one or more aspects of the disclosure. For example, the wireless device 300 may comprise an antenna 310 (which may be an implementation of the antenna 110 or the antenna 210) comprising a segment 310*a* and a feed element 310*b*. The segment 310*a* may conform to a curvilinear shape. For example, the segment 310*a* may be a helix-shaped segment. A portion of the segment 310*a* (e.g., closest to the feed element 310*b*) may be located a first distance from a ground plane 311. Non-limiting examples of the first distance may include approximately 2 millimeters, in the range of 2 millimeters to 5 millimeters, in the range of 2 millimeters to 10 millimeters, or in any other range or of any other value.

The wireless device 300 may further comprise a user-interactive element 315, which may be the same user-interactive element 115 depicted in FIG. 1. The user-interactive element 315 may comprise a first element 315*a* electrically connected to a ground plane 311, a second element 315*b* electrically connected with (e.g., at a right angle, an obtuse angle, or an acute angle) the first element 315*a* and that extends perpendicularly away from the ground plane 311, and a third element 315*c* electrically connected with (e.g., a right angle, an obtuse angle, or an acute angle) the second element 315*b*. The user-interactive element may receive input via user-interactions with the third element 315*c*. The first element 315*a* and second element 315*b* of the user-interactive element 315 may be hidden and/or not be accessible and/or responsive to typical user interactions (e.g., one or more of a pushing motion of a user finger, a tapping motion of a user finger, or a sliding motion of a user finger). A portion of the third element 315*c* may be located a second distance from the ground plane. Non-limiting examples of the second distance may include approximately 2 millimeters, in the range of 2 millimeters to 10 millimeters, in the range of 2 millimeters to 20 millimeters, or in any other range or of any other value.

Moreover, the second distance may be greater than the first distance. For example, FIG. 3 shows an example of a typical user-interaction 350 with the third element 315*c*. The typical user-interaction with the third element 315*c* may occur at a distance from the ground plane 311 that is greater than or equal to the second distance. A third distance (e.g., a distance equivalent to a difference between the second distance and the first distance) between the segment 310*a* and the typical user-interaction 350 may minimize antenna detuning. For example, detuning of the antenna 110 due to the user-interaction 350 may be reduced if the third distance is greater than a threshold near-field distance (e.g., a distance defining a boundary within a reactive near-field) of the antenna 110. Non-limiting examples of the third distance may include approximately 2 millimeters, in the range of 2 millimeters to 5 millimeters, in the range of 2 millimeters to 10 millimeters, or in any other range or of any other value.

Figure 4:
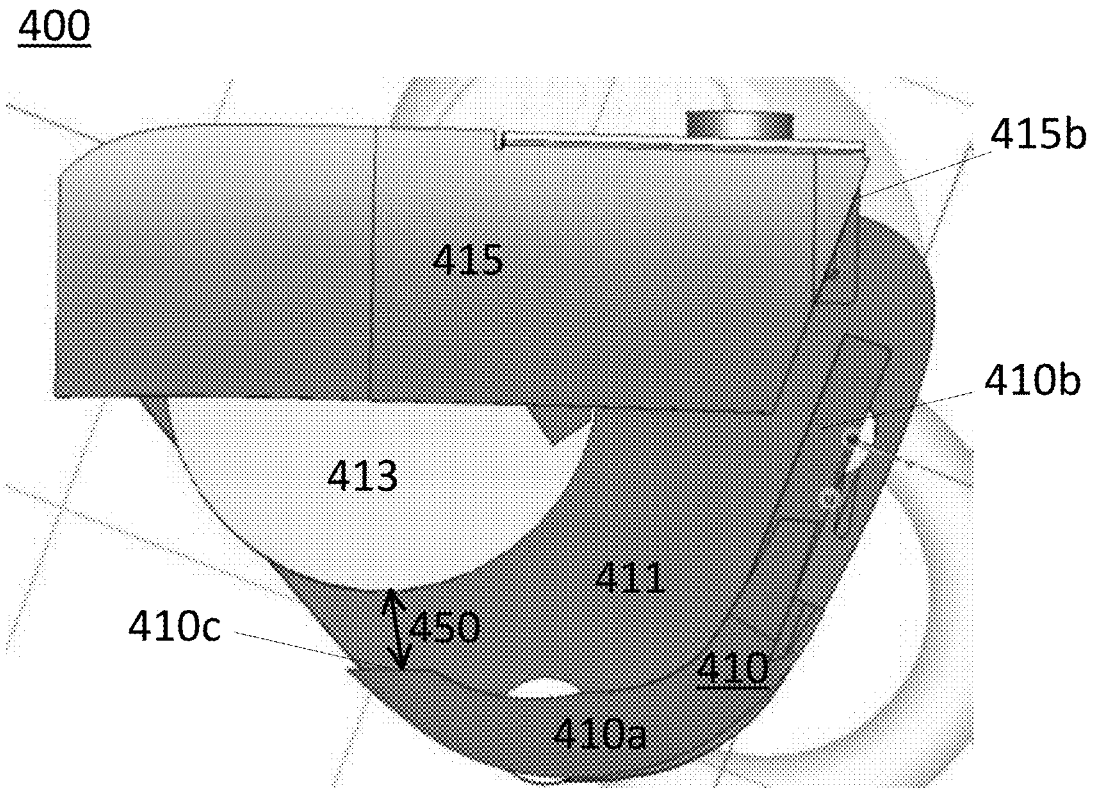
FIG. 4 shows a top-down view of an example arrangement of components of a wireless device in accordance with one or more aspects of the disclosure.

FIG. 4 shows a top-down view of an example arrangement of components of a wireless device 400 (which may be, e.g., the same as wireless device 100 as shown in FIG. 1 and/or the same as wireless device 300 as shown in FIG. 3) in accordance with one or more aspects of the disclosure. The wireless device 400 may comprise a ground plane 411 and an antenna 410 comprising a segment 410*a* and a feed element 410*b*. Moreover, the wireless device 400 may comprise a power source 413 and a user-interactive element 415. The user-interactive element 415 may be implemented as, for example, user-interactive element 315. As shown in FIG. 4, the user-interactive element 415 may partially or fully obstruct (e.g., block from view) a view of the power source 413. For example, when viewed from the top-down perspective of FIG. 4, the user-interactive element 415 may be fully visible, but only a portion of the power source 413 may be visible.

The segment 410*a* may comprise a backend 410*c*, wherein the segment 410*a* and/or any other portion of the wireless device 400 may be manufactured such that a specific predetermined separation distance 450 exists between the backend 410*c* and a closest edge of the power source 413. Detuning sensitivity of the antenna 410, and hence performance degradation of the wireless device 400, may increase as the separation distance 450 shrinks, and may render detuning sensitivity and/or performance unacceptable if the separation distance 450 is below a threshold distance. Non-limiting examples of the threshold distance may depend upon the configuration of the wireless device 400, and may include approximately 1 millimeter, in the range of 1 millimeter to 2 millimeters, in the range of 1 millimeter to 5 millimeters, or in any other range or of any other value. For example, unacceptable performance degradation of the wireless device 400 may result based on a portion (e.g., a volume) of the power source 413 being located within a reactive near-field region of the antenna segment 410. As further discussed below, in connection with FIG. 5, the separation distance 450 may be increased to be, e.g., greater than the threshold distance, resulting in a lesser portion (or lesser volume) of the power source 413 being located within a reactive near-field region of the antenna 410. Thus, an increase of the separation distance 450 may result in an increased detune resiliency of the antenna 410 and overall increased performance of the wireless device 400. On the other hand, if distance 450 is very large, then this may make the wireless device 400 too large for its practical purpose. Thus, there may be a range of values of the distance 450 that are practical: a value of the distance 450 that is larger than the threshold distance under which unacceptable detuning sensitivity may exist, while not so large that the wireless device 400 is unacceptably large as a result. It may therefore be desirable to manufacture each sample of the wireless device 400 such that the distance 450 remains at a predetermined value within a tightly controlled tolerance and that is greater than the threshold distance for the wireless device 400.

Performance degradation of the wireless device 400 may also result based on a location of the user-interactive element 415 and the antenna 410. For example, when viewed from a top-down perspective, a portion (not shown in FIG. 4) of the user-interactive element 415 may obstruct a view of a portion of the antenna 410. Thus, radiation emitted from the portion of the antenna 410 may be blocked by the portion of the user-interactive element 415. The blocking of radiation emitted from the antenna 410 may result in performance degradation of the wireless device 400. However, and as further discussed below in connection with FIG. 5, a slanted backend 415*b* or other slanted edge of the user-interactive element 415 may reduce the radiation blocking of the antenna 410 that would otherwise be caused by the user-interactive element 415.

Figure 5:
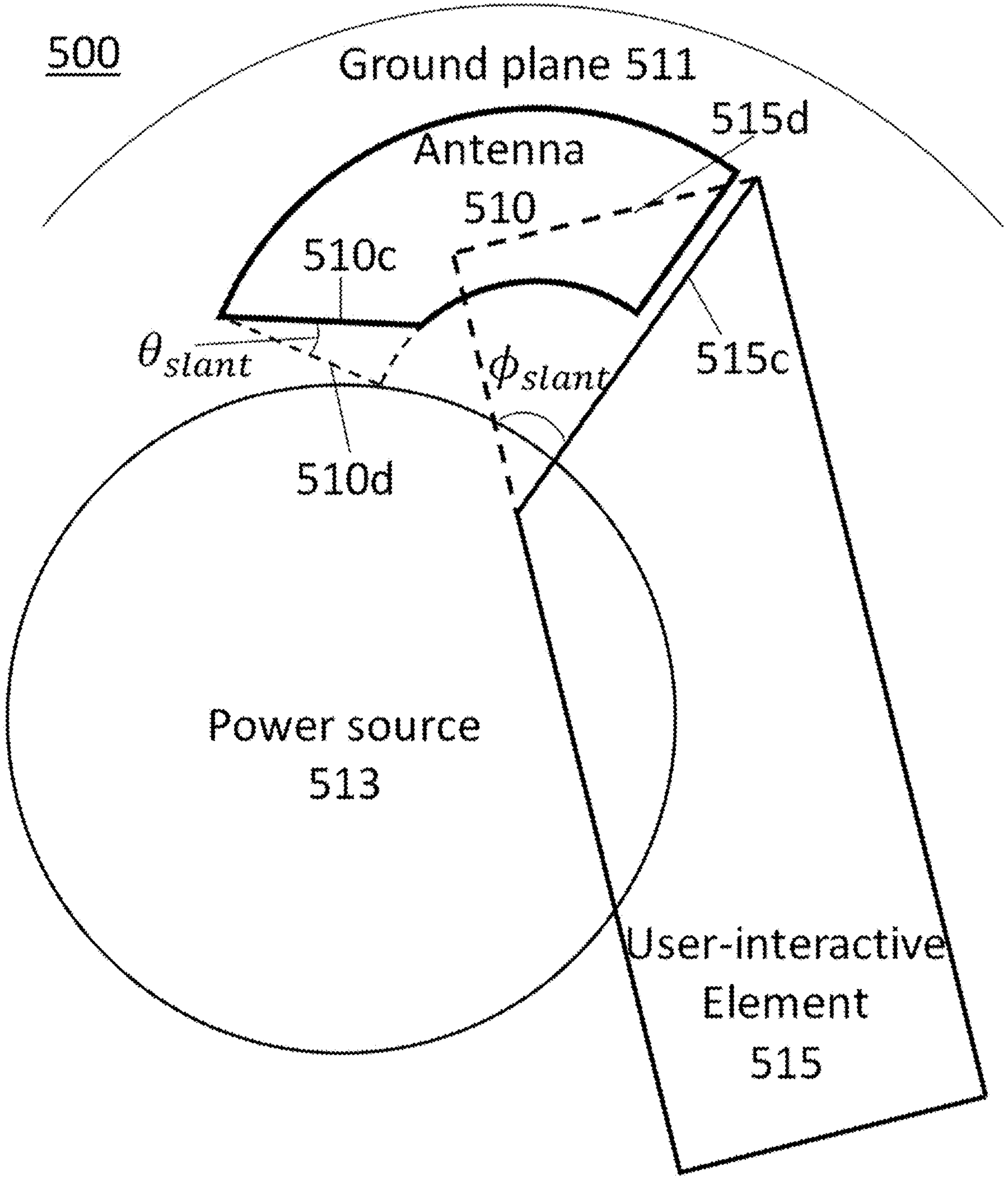
FIG. 5 shows an example arrangement of components of a wireless device in accordance with one or more aspects of the disclosure.

FIG. 5 shows an example arrangement of components of a wireless device 500 in accordance with one or more aspects of the disclosure. The wireless device 500 may, for example, be wireless device 100 (shown in FIG. 1), wireless device 300 (shown in FIG. 3), and/or wireless device 400 (shown in FIG. 4). The wireless device 500 may comprise an antenna 510 which may be the same as any one of antennas 110, 210, 310, and/or 410. Moreover, the antenna 510 may be a PIFA antenna that has been modified with respect to conventional PIFA antennas as described herein. The modified PIFA antenna may comprise an electrically conductive (e.g., metal) segment that may be curvilinear and that may follow (e.g., may be parallel with) an edge of an electrically conductive (e.g., metal) ground plane 510. For example, an edge of the antenna 510 may stay a fixed distance from the edge of the ground plane 511, remain within a maximum distance from the edge of the ground plane 511, and/or generally have an edge that follows the shape of the edge of the ground plane 511. Non-limiting examples of the fixed distance or maximum distance may include 0 millimeters, in the range of 0 millimeters to 2 millimeters, in the range of 0 millimeters to 5 millimeters, or in any other range or of any other value.

The antenna 510 may comprise one or more curved and/or straight portions that may form the shape of, for example, a partial circle, a piecewise combination of curved portions, and/or a piecewise combination of curved and straight portions. Furthermore, the antenna 510 may terminate in a back end 510*c*, which as explained below may have a slanted edge that maximizes a distance between the antenna backend and a power source 513 of the wireless device 500. The slanted edge of the back end 510*c* may further extend the physical length of antenna 510 and allow a desired in-band antenna resonance given limited design space constraints inherent to smaller (e.g., wearable) devices (e.g. Bluetooth earbuds or other types of wireless devices).

Furthermore, FIG. 5 shows an example configuration of the backend 510*c* of the antenna 510. The configuration of the antenna 510 may improve antenna detune resiliency. Moreover, proximity of the power source 513 to the back end 510*c* may severely detune the antenna 510. Thus, tapering backend 510*c* of such an antenna may improve (increase) antenna detuning resiliency and may improve (increase) the transmission and/or reception efficiency of such an antenna. For example, FIG. 5 shows the antenna 510 as a modified PIFA antenna with the tapered backend 510*c* having a slant angle $\theta_{slant}$. The angle $\theta_{slant}$ may be an acute angle, such as in the range of 10 degrees to 30 degrees, or in the range of 30 degrees to 50 degrees, or within any other range or of any other value. For comparison with the tapered backend 510*c*, a modified PIFA antenna 510 without a tapered backend may instead have a backend 510*d*, shown in FIG. 5 as a dashed line. The power source 513 may come within a close proximity with (e.g., within a reactive near-field of) the antenna 510, thus potentially causing severe performance degradation of the wireless device 500. Tapering the backend (e.g., backend 510*c*) may remove portions of the antenna 510 in close proximity with the power source 513. Thus, the tapered configuration may exhibit, based on the slanted backend configuration, an overall increased detune resiliency despite the proximity of the power source 513.

Furthermore, there may be an optimal tapering angle of the backend 510*c* for a given antenna 510 that maximizes the antenna's 510 in-band performance as compared with other tapering angles. Therefore, the backend 150*c* of the antenna 510 may be tapered, and this tapering may be selected so as to improve antenna detuning resiliency. The backend 510*c* configuration may, for example, have a taper that is at a particular angle with respect to a lengthwise side of the antenna 510. The particular angle selected may depend upon the particular antenna 510 configuration, and a desired (e.g., optimal) angle that improves antenna detuning resiliency may be determined using known computer simulation and/or antenna testing techniques. For example, computer simulations of the antenna with various tapering angles may be performed, and the tapering angle resulting in the best (or otherwise most desired) performance may be selected. Moreover, the same configurations of the slant angle of the back end 150*c* may also be implemented when the antenna 510 is of another shape, such as linear or any other type of curvilinear shape.

Furthermore, the user-interactive element 515 may comprise one or more straight and/or curved portions that may form the shape of, for example, a rectangle, a partial circle, a piecewise combination of curved portions, and/or a piecewise combination of curved and straight portions. Furthermore, the user-interactive element 515 may terminate in a back end 515*c* or other portion, which as explained below may have a slanted edge that may increase (e.g., maximize) a distance between the user-interactive element backend 515*c* and the antenna 510.

For example, FIG. 5 shows the user-interactive element 515 with a tapered backend 515*c* corresponding to an angle $\phi_{slant}$. The angle $\phi_{slant}$ may be an acute angle, such as in the range of 10 degrees to 30 degrees, or in the range of 30 degrees to 50 degrees, or within any other range or of any other value. For comparison with the tapered backend 515*c*, a user-interactive element 515 without a tapered backend may instead have a backend 515*d*, shown in FIG. 5 as a dashed line. Without the tapering of the backend 515*c*, radiation emitted from the antenna 510 may be partially blocked by the backend 515*d*, thus potentially causing severe performance degradation of the wireless device 500 in some cases. Tapering the backend (e.g., backend 515*c*) may decrease this blocking of radiation by increasing the distance between at least a portion of the user-interactive element 515 and the antenna 510. Thus, the tapered backend configuration of the user-interactive element 515 may result in an overall increased device performance.

Furthermore, there may be an optimal tapering angle $\phi_{slant}$ (as compared with other tapering angles) of the backend 515*c* for a given user-interactive element 515 that minimizes blocking of radiation emitted from the antenna 510. The backend 515*c* of the user-interactive element 515 may be tapered, and this tapering may be selected so as to decrease radiation blocking that would otherwise occur without the tapering. The backend 515*c* configuration may, for example, have a taper that is at a particular angle with respect to a lengthwise side of the user-interactive element 515. The particular angle selected may depend upon the particular configuration of the user-interactive element 515, and a desired (e.g., optimal) angle that decreases radiation blocking may be determined using known computer simulation and/or antenna testing techniques. For example, computer simulations of the wireless device 500 with various tapering angles $\phi_{slant}$ may be performed, and the tapering angle $\phi_{slant}$ resulting in the best performance may be selected. Moreover, the same configurations of the slant angle $\phi_{slant}$ may also be implemented when the user-interactive element 515 is of another shape, such as linear or any other type of curvilinear shape.

Figure 6:
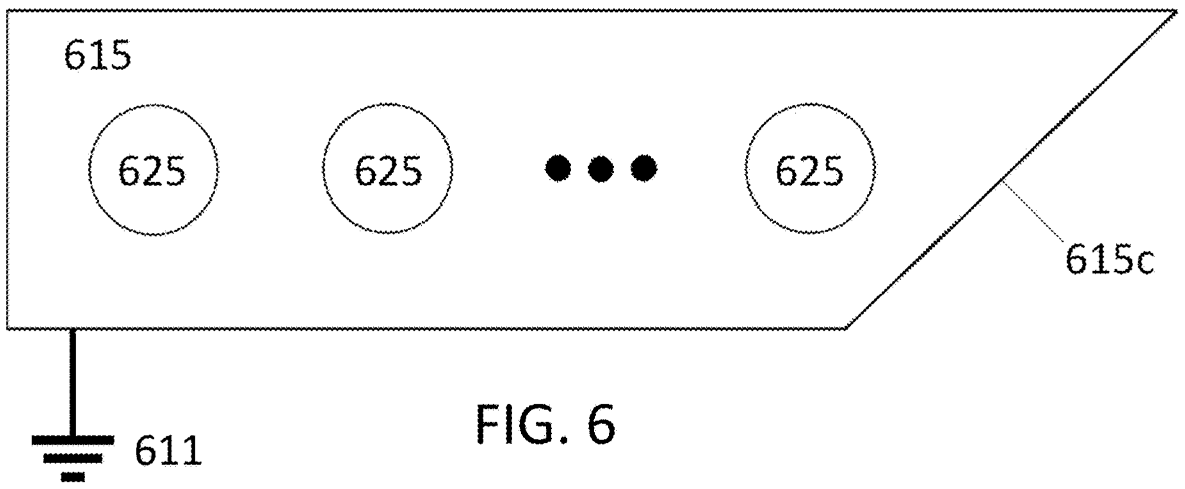
FIG. 6 shows an example configuration of a user-interactive element in accordance with one or more aspects of the disclosure.

FIG. 6 shows an example configuration of a user-interactive element 615. The user-interactive element 615 may comprise a slanted backend 615*c* or other slanted portion and may, for example, be composed of printed sheet metal and/or other conductive materials printed on a PCB substrate. Moreover, the user-interactive element 615 may be in direct electrical contact with the ground plane 611 (shown in FIG. 6 as an electrical ground symbol), which may be the same as the ground plane 111. Electrical grounding of the user-interactive element 615 may improve a radiated efficiency of an antenna (not shown in FIG. 6, e.g., any one of antennas 110, 210, 310, 410, or 510). For example, the antenna and the grounded user-interactive element 615 may function together as an effective a V-shaped antenna.

The user-interactive element 615 may be or otherwise comprise a touch sensor (e.g., a tactile sensor) comprising one or more touch sensor pads 625. The touch sensor may be configured to receive, via the one or more touch sensor pads 625, physical touch from a user. Moreover, the touch sensor may comprise a capacitive touch-sensing device, which may comprise a touch sensor pad 625 that may comprise a conductive region (e.g., a circular region filled with metal wire wound into a spiral) configured to detect changes in nearby electrical and/or magnetic fields. A wireless device comprising the user-interactive element 615 (e.g., wireless device 100) may be configured to monitor changes in electric current received via the touch sensor pad or other element of the touch sensor 615. For example, a user interaction (e.g., user interaction 350) with the touch sensor 615 may cause a change in electric and/or magnetic field near the touch sensor, resulting in impedance/voltage/current output change from the touch sensor pad 625.

Alternatively, the touch sensor 615 may be, for example, a resistive touch-sensing device. For example, a touch sensor pad 625 of the touch sensor 615 may comprise a first conductive region, a non-conductive separation region, and a second conductive layer. The touch sensor pad 625 may be configured to detect changes in pressure. For example, a user interaction (e.g., user-interaction 350) with the touch sensor pad 625 may cause a change in an electric field gradient between the first and second conductive regions, resulting in impedance/voltage/current output change from the touch sensor pad 625.

A wireless device (e.g., any one of wireless devices 100, 300, 400, or 500) may be configured to monitor changes in electric impedance/voltage/current received via the one or more touch sensor pads 625. For example, the wireless device may detect changes in electrical impedance/voltage/current output from one or more of the one or more touch sensor pads 625. The detected changes in electrical impedance/voltage/current output of the one or more touch sensor pads 625 may indicate one or more types of user interactions with the touch sensor.

For example, the wireless device may determine, based on detecting changes in electrical impedance/voltage/current output of one or more of the one or more touch sensor pads 625, that a tapping gesture (e.g., tapping with a user's finger) has occurred on one or more portions of the touch sensor 615. Also or alternatively, the wireless device may determine, based on detecting changes in electrical impedance/voltage/current output of one or more of the one or more touch sensor pads 625, that a pressing gesture (e.g., pressing with a user's finger) has occurred on one or more portions of the touch sensor 625. Also or alternatively, the wireless device may determine, based on detecting changes in electrical impedance/voltage/current output of one or more of the one or more touch sensor pads 625, that a sliding gesture (e.g., pressing with a user's finger followed by a sliding motion) has occurred on one or more portions of the touch sensor 625. The wireless device may be configured to perform one or more functions of the wireless device based on the determined tapping, pressing, sliding, and/or other gestures.

Figure 7:
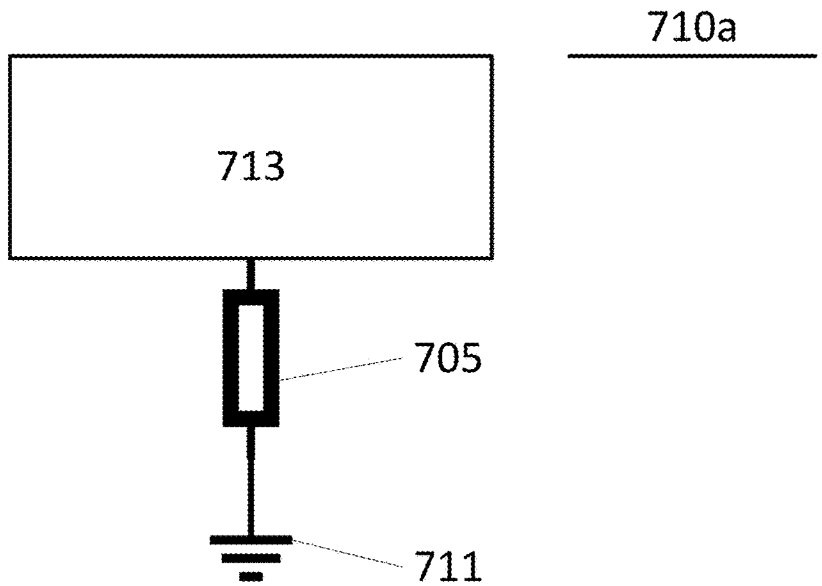
FIG. 7 shows an example configuration of a power source in accordance with one or more aspects of the disclosure.

FIG. 7 shows an example configuration of a power source 713 of a wireless device (e.g., any of the wireless devices described herein, such as wireless device 100). The power source 713 may be, for example, a non-rechargeable or rechargeable battery. The power source 713 may be electrically connected to a ground 711 (shown schematically in FIG. 7 as an electrical ground symbol), which may be a ground plane of the wireless device 400 such as the ground plane 111 or any other ground plane, or a Vcc connection of the wireless device 400, or a control connection of the wireless device. The electrical connection to the ground 711 may be made via an impedance network 705 (shown schematically in FIG. 7 as an electrical impedance symbol). The impedance network 705 may comprise at least one of an inductor or a ferrite bead. The inductor or ferrite bead may be selected such that the impedance network 705 has a maximum or other desired impedance at the operating frequency of the antenna of the wireless device, such as the antenna 110 or any other antenna described herein. For example, the impedance network 705 may be configured to electrically isolate the power source 713 from the ground 711 at the operating frequency of the antenna. An example cross-section of a segment 710*a* of the antenna is shown in FIG. 7. The segment 710*a* may correspond to, for example, any one of segment 110*a* of FIG. 1, segment 215 of FIG. 2, segment 310*a* of FIG. 3, or segment 410*a* of FIG. 4. Thus, electromagnetic coupling between the power source 713 and the antenna may be minimized with the impedance network 705, resulting in overall improved wireless device performance.

In the above examples, it may be desirable that the relative positions and/or orientations of certain components of the wireless device 800. This may be accomplished by, for example, one or more structures that serve as a fixed point of reference that maintains the physical position and/or orientation of each of one or more components of the wireless device 800. For example, it may be desirable that the distance and relative rotational orientations of the radio frequency antenna with respect to the battery, user interface, or ground be maintained in a fixed state. Examples of how this may be accomplished are described next with respect to FIGS. 8-15. As will be discussed, a spacer 801 may be used to maintain these positions and/or orientations of the various components of the wireless device 800 with respect to one another.

Figure 8:
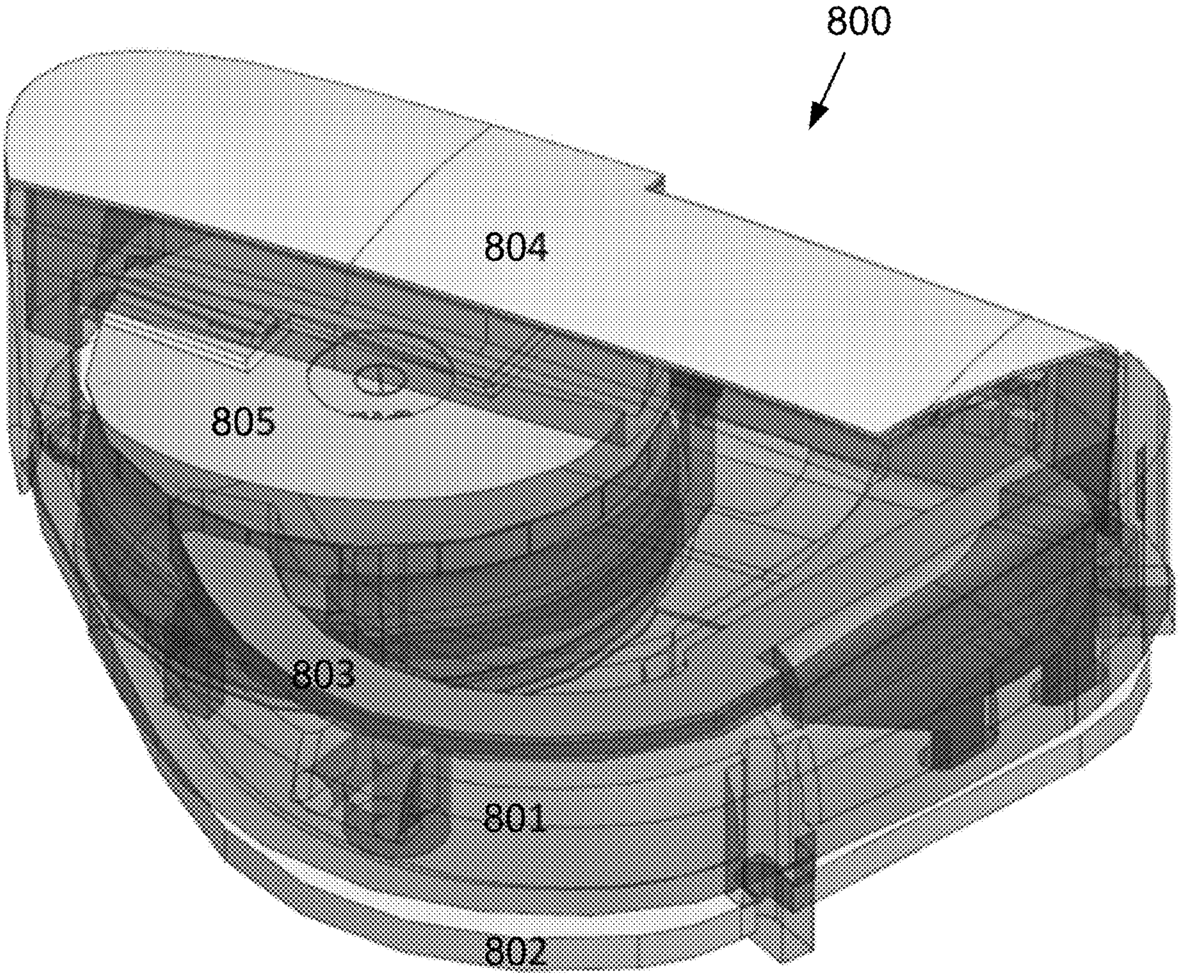
FIG. 8 shows a perspective cutaway view of an example arrangement of components of a wireless device in accordance with one or more aspects of the disclosure.
Figure 9:
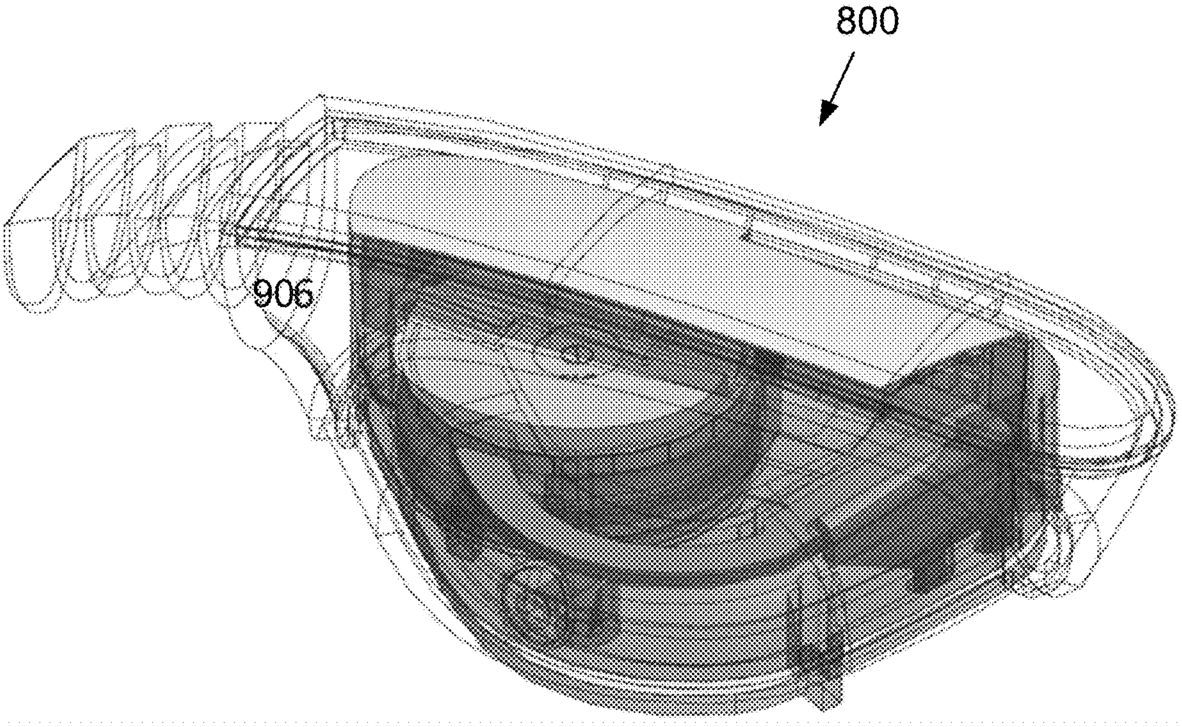
FIG. 9 shows a perspective cutaway view of an example arrangement of components of a wireless device in accordance with one or more aspects of the disclosure.

FIGS. 8 and 9 show an example arrangement of components of at least a portion of a wireless device 800. The wireless device 800 may be similar to, or a variation of, any of the wireless devices described above, such as the wireless device 100. For example, the wireless device may be an earbud-type device, or another type of earphone device such as a headphone device. The wireless device 800 may be as described above for the other wireless devices. In addition or as a variation, the wireless device may include a spacer 801 that is configured to constrain a plurality of degrees of freedom of various parts of the wireless device 800. For example, the spacer 801 may constrain three degrees of freedom for a circuitry substrate 802 such as a PCB board 802 (which may contain circuitry of the wireless device 800), a radio frequency antenna 803, a user interface 804 such as a touch-sensitive capacitive interface (which may be, for example, user-interactive element 115 of FIG. 1), a battery 805, and/or an exterior housing 906 (FIG. 9).

The spacer 801 may have a shape and location configured to as to constrain any of the circuitry substrate 802, the radio frequency antenna 803, the user interface 804 such as a touch-sensitive capacitive interface, the battery 805, and/or the exterior housing 906 to be at a particular orientation, rotationally speaking, with respect to one another. This may be accomplished by, for example, the spacer 801 having a surface that has two or more points of contact in common with each of (or any one or more of) the above elements. The spacer 801 may additionally or alternatively constrain each of the circuitry substrate 802, the radio frequency antenna 803, the user interface 804 such as a touch-sensitive capacitive interface, the battery 805, and/or the exterior housing 906 to be at a particular spacing from one another. For example, a particular fixed spacing between the antenna 803 and the substrate 802 may be implemented by using an appropriate shape of the spacer 801 that is in contact with the antenna 803 and the substrate 802. As another example, a particular fixed spacing between the antenna 803 and the user interface 804 may be implemented by using an appropriate shape of the spacer 801 that is in contact with the antenna 803 and the user interface 804. As another example, a particular fixed spacing between the antenna 803 and the battery 805 may be implemented by using an appropriate shape of the spacer 801 that is in contact with the antenna 803 and the battery 805. As another example, a particular fixed spacing between the antenna 803 and the exterior housing 906 may be desired by using an appropriate shape of the spacer 801 that is in contact with the antenna 803 and the exterior housing 906. Any of these examples of fixed spacing between various components may be combined in a single device using a single spacer 801. By the spacer 801 maintaining relative rotational orientations with respect to two or more of the elements of the wireless device 800, and/or by the spacer 801 maintaining a fixed spacing between two or more of the elements of the wireless device 800, the radio frequency characteristics of the wireless device 800 may be more stable and predictable. Moreover, the use of the spacer 801 may allow for smaller manufacturing tolerances in the final product when manufacturing multiple instances of the wireless device 800. This is because the spacer 801 may, in effect, enforce particular orientations and/or spacing between various elements of the wireless device 800. This may be particularly true where the spacer 801 is itself manufactured using a process such that its manufactured dimensions are repeatable within small tolerances, such as by a molding process. For example, the spacer 801 may be made of an insulating (e.g., non-electrically conductive or extremely low-electrically conductive) material such as a plastic material or other material that may be liquefied and injected into a mold.

Figure 10:
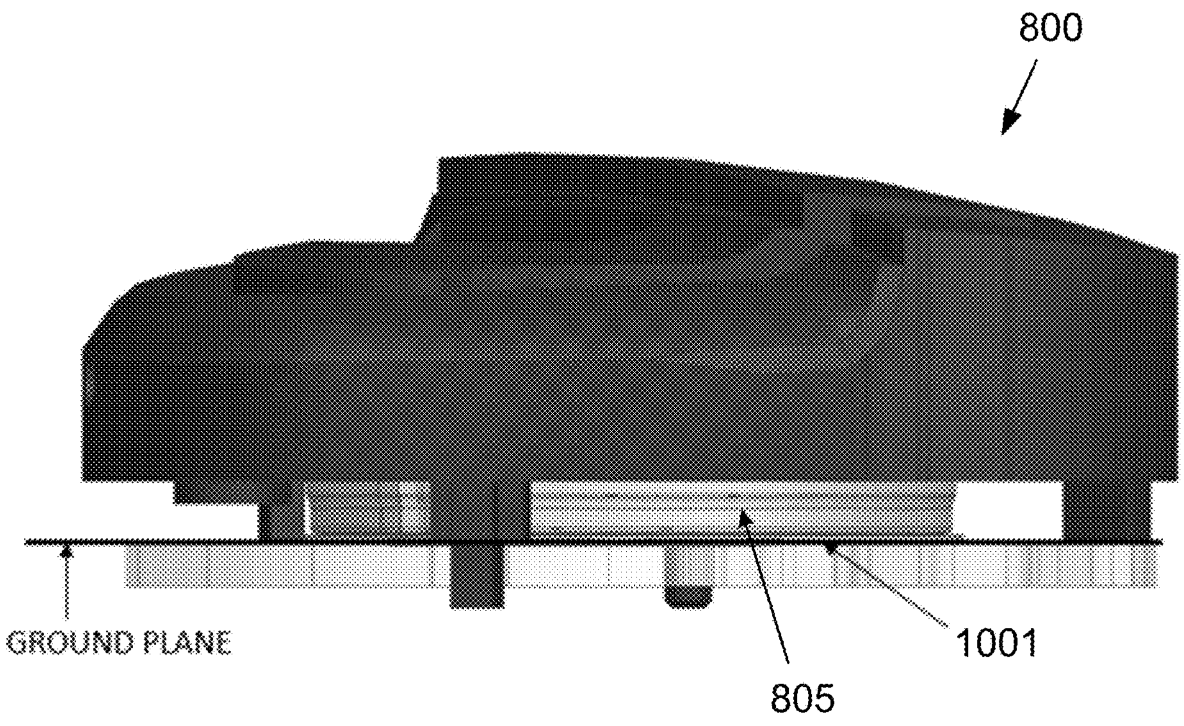
FIG. 10 shows a side view of an example arrangement of components of a wireless device in accordance with one or more aspects of the disclosure.
Figure 11:
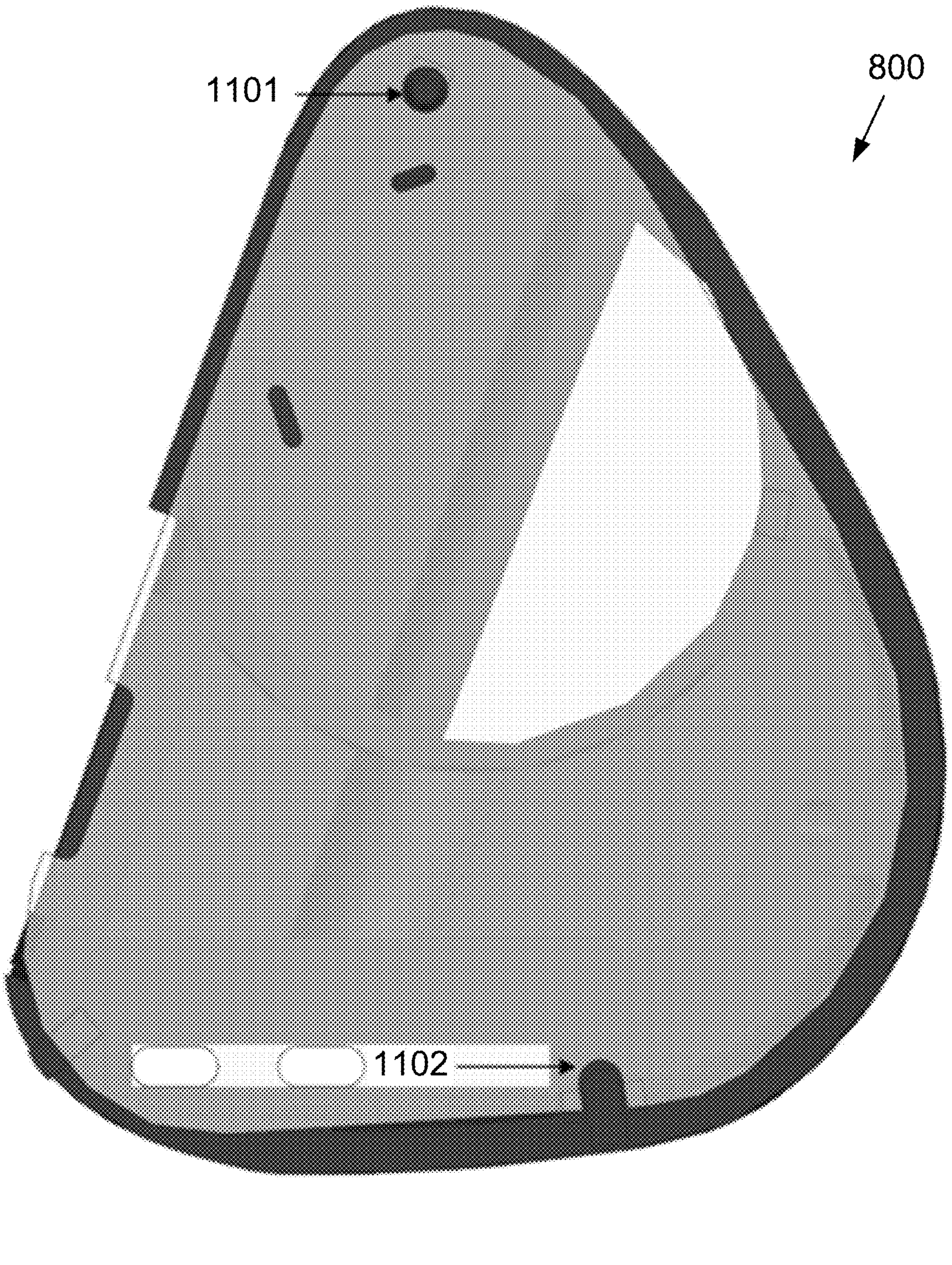
FIG. 11 shows a top view of an example arrangement of components of a wireless device in accordance with one or more aspects of the disclosure.

Referring to FIGS. 10 and 11, the battery 805 may be disposed on a ground plane 1001 (FIG. 10). The circuitry substrate 802 may be constrained by the spacer 801 at multiple points of contact in the vertical orientation of the figure. The ground plane 1001 may be a critical plane in which the various radio frequency (RF) sensitive mechanical components may be references. Lateral positioning of the circuitry substrate 802 may additionally or alternatively be maintained relative to the exterior housing 906 and/or any other components by a post 1101 that may extend through a hole in the circuitry substrate 802. Angular rotation of the circuitry substrate 802 may additionally or alternatively be maintained relative to the exterior housing 906 and/or any other components by another post 1102 that may extend through another hole (for example, a slot) in the circuitry substrate 802.

Figure 12:
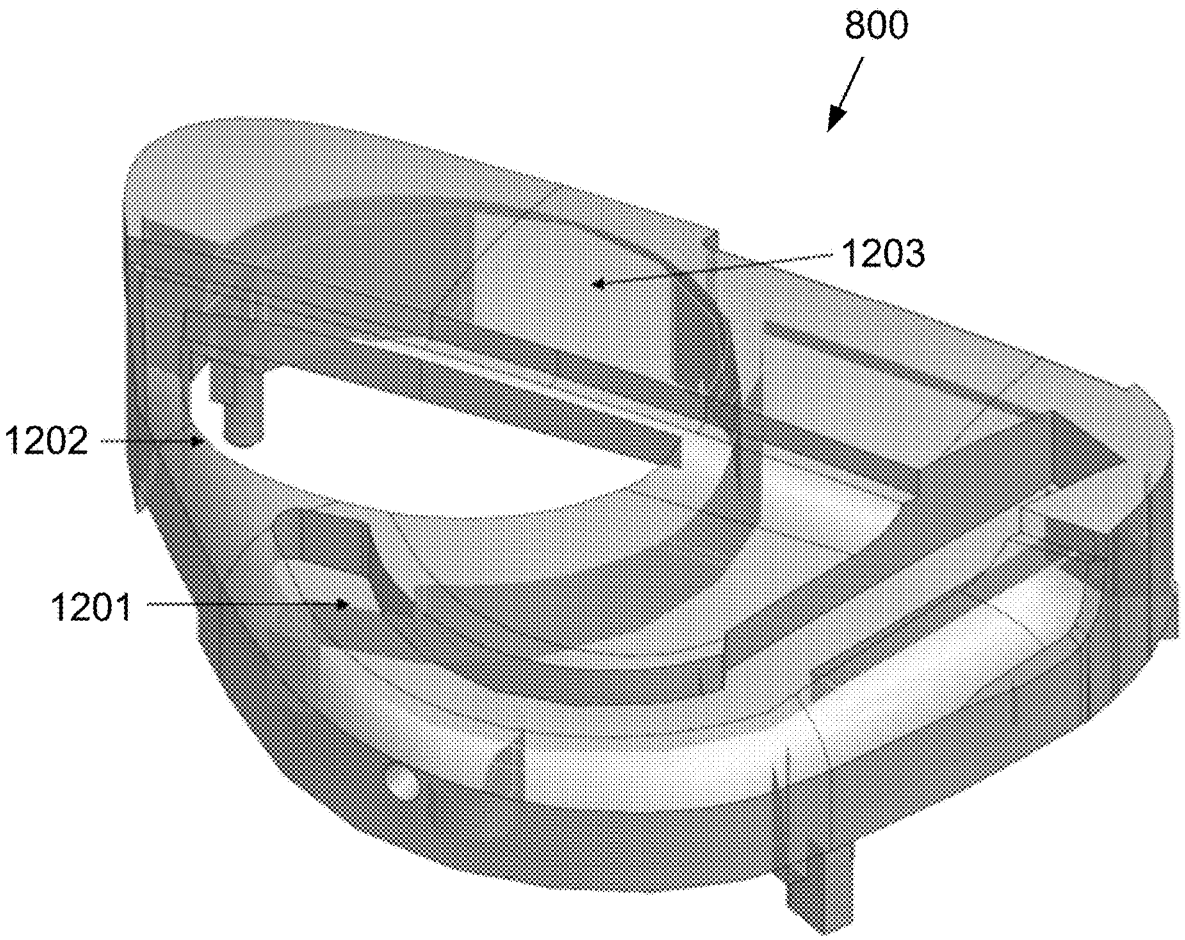
FIG. 12 shows a perspective cutaway view of an example arrangement of components of a wireless device in accordance with one or more aspects of the disclosure.
Figure 14:
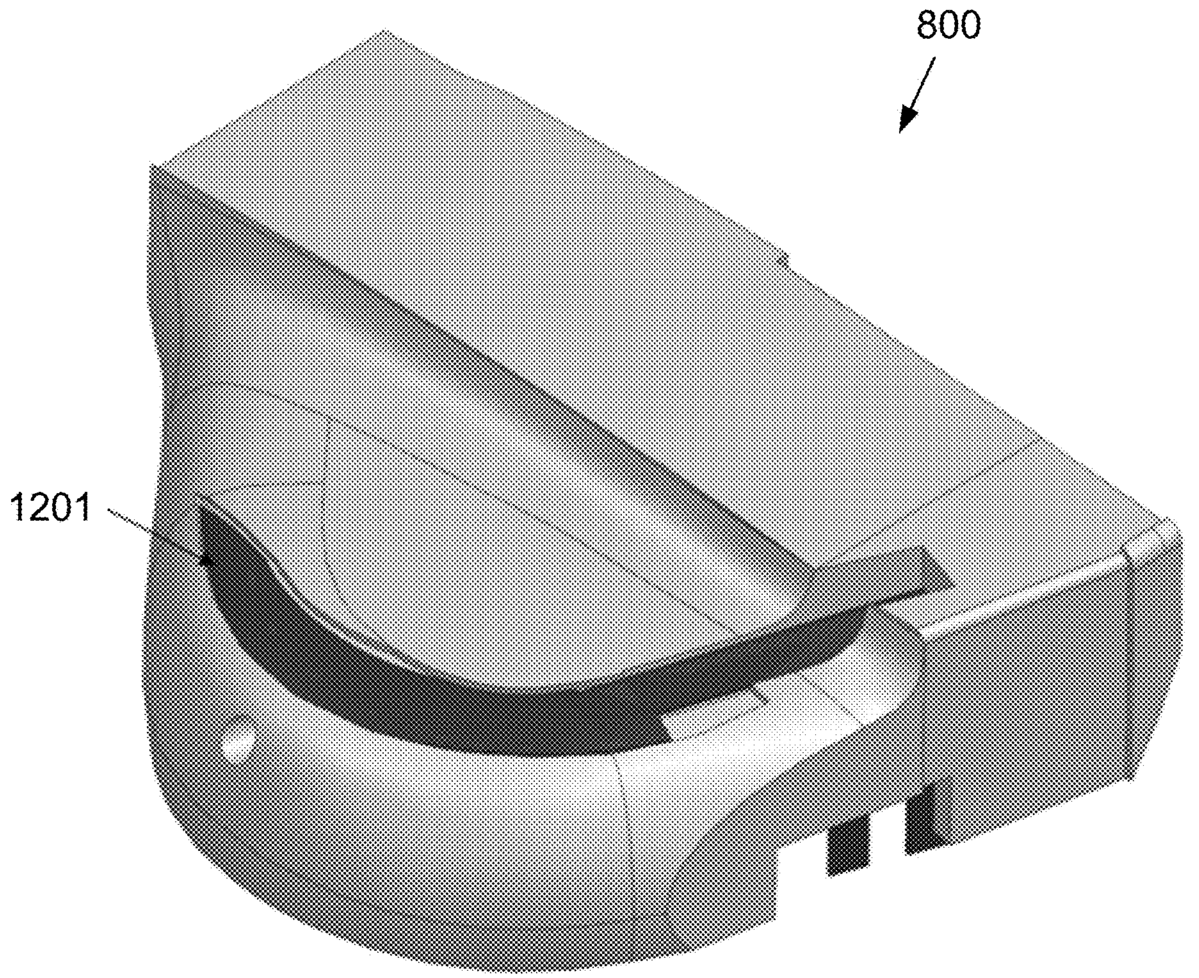
FIG. 14 shows a perspective view of an example arrangement of components of a wireless device in accordance with one or more aspects of the disclosure.

Referring to FIG. 12, the radio frequency antenna 803 may be generally flat and may sit directly in a recessed portion 1201 of the wireless device 800, referred to herein as an antenna pocket. The antenna pocket 1201 may have generally a same shape as the radio frequency antenna 803, such that the radio frequency antenna 803 fits within the antenna pocket 1201. The antenna pocket 1201 may thereby help to maintain a fixed position of the radio frequency antenna 803. As shown in FIG. 14, the antenna pocket 1201 may have a color that is different from a color of a surrounding portion of the wireless device 801. Referring again to FIG. 12, a circular opening 1202 may help to maintain a fixed position of the battery 805. A capacitive flexible surface 1203 may be a designated area over which the user interface 804 may rest. Any or all of the elements discussed herein—for example, the radio frequency antenna 803, the battery 805, and/or the user interface 804—may be physically constrained in location and/or in rotation with respect to one another by the spacer 801.

Figure 13:
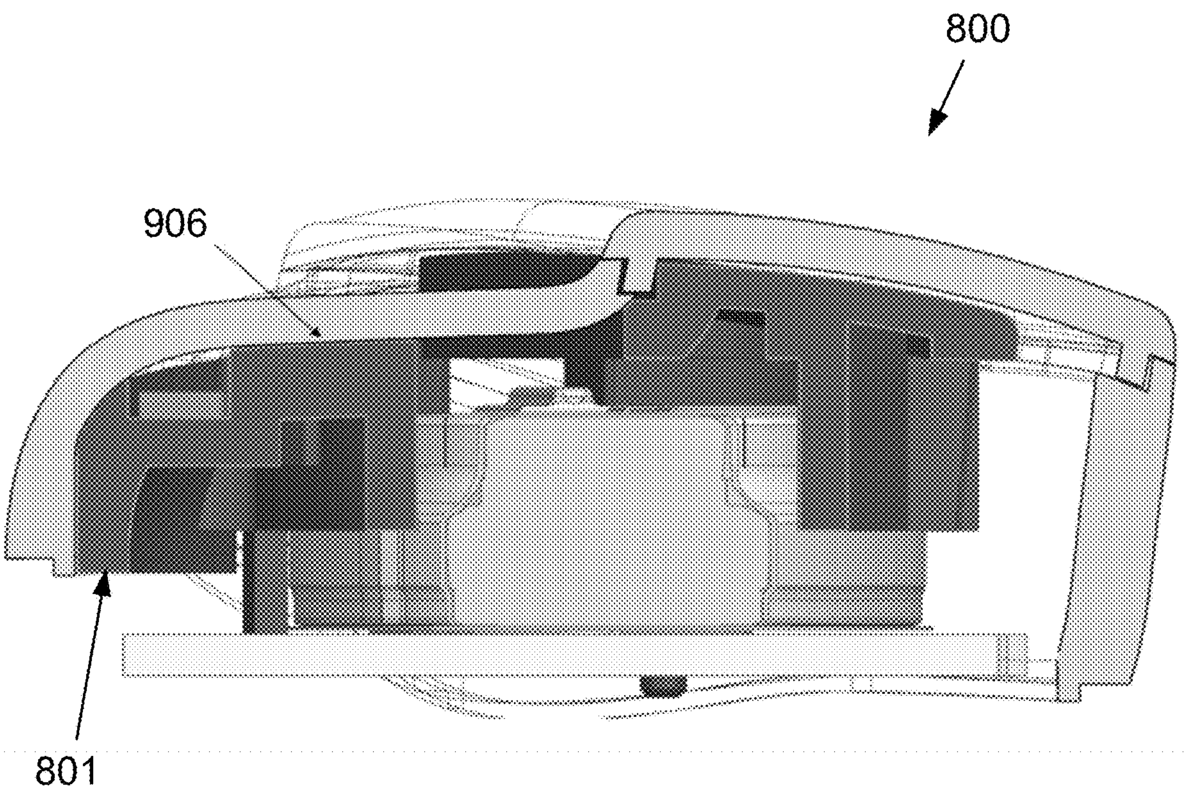
FIG. 13 shows a side cutaway view of an example arrangement of components of a wireless device in accordance with one or more aspects of the disclosure.

Referring to FIG. 13, the spacer 801 may rest against (for example, be in physical contact with) an inner surface of the external housing 906. The inner surface of the external housing 906 may be contoured to match a contour of the spacer 801 at the point(s) of contact. This may maintain a close-fitting control element between the two components 801 and 906. The external housing 906 may provide a spatial point of reference for maintaining the location of the spacer 801. And, as discussed above, the spacer 801 may provide a spatial point of reference for one or more other elements of the wireless device 800.

Figure 15:
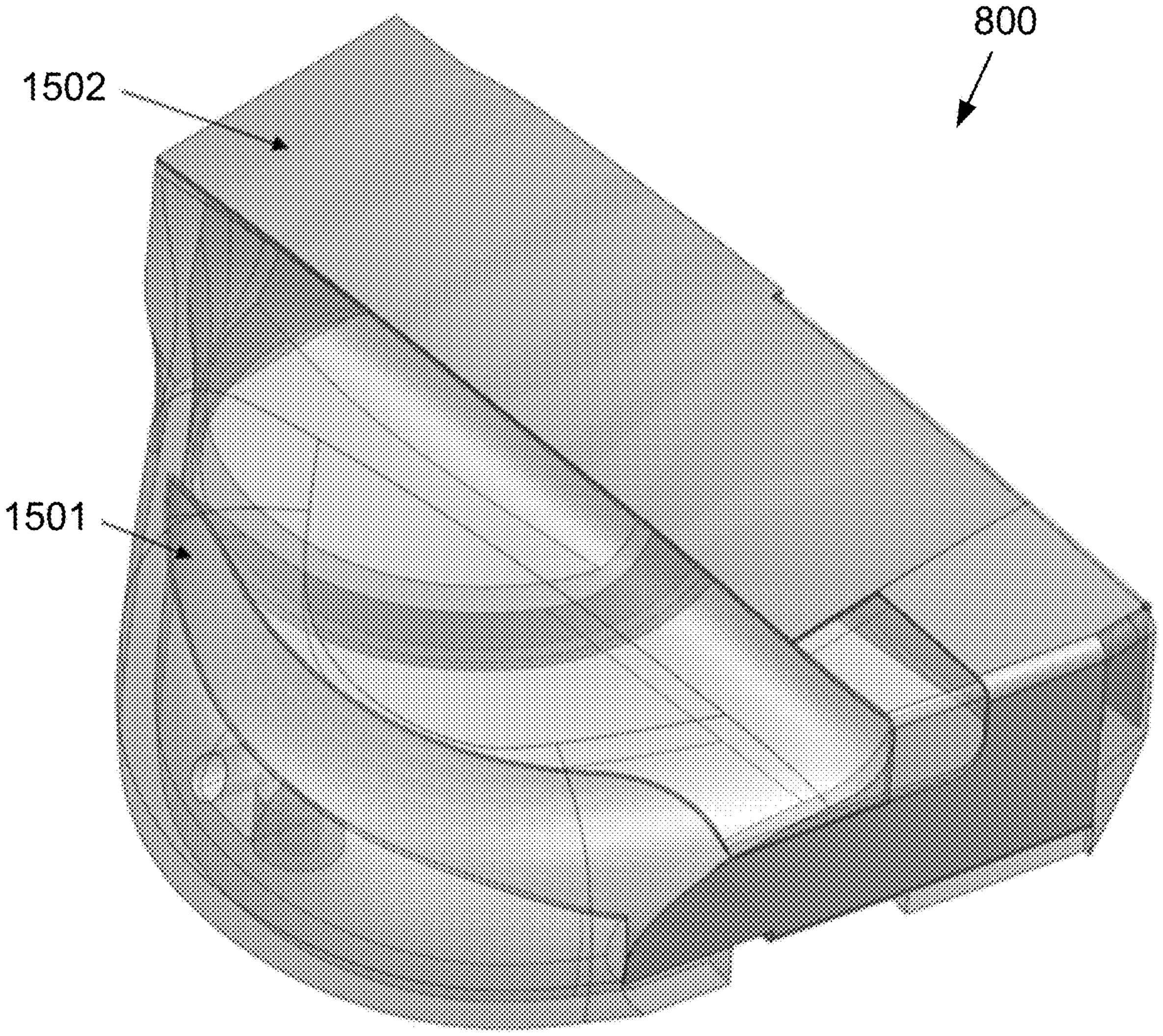
FIG. 15 shows a perspective cutaway view of an example arrangement of components of a wireless device in accordance with one or more aspects of the disclosure.

Referring to FIG. 15, the radio frequency antenna 803 may be implemented as a flexible antenna 1501 that is wrapped around and/or otherwise attached to (for example, via a pressure-sensitive adhesive) the spacer 801. Similarly, the user interface 804 may be implemented as a flexible surface 1502 that is attached to (for example, via a pressure-sensitive adhesive) the spacer 801. In both of these cases, the radio frequency antenna 1501 and/or the user interface flexible surface 1502 may thereby have a fixed positional and rotational location with respect to the spacer 801.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

The invention claimed is:

1. A wireless audio device comprising:

a frame defining a plurality of regions that are configured to retain a plurality of components of the wireless audio device; and an antenna comprising:

a ground plane; and a radiative component comprising:

a feed element electrically connected to the ground plane;

a first conducting element comprising a front end and a back end, wherein the front end is electrically connected to the feed element, and wherein the back end is tapered; and a second conducting element electrically connected to the ground plane and accessible to user interactions, wherein a first region, of the plurality of regions, is configured to retain at least a portion of the antenna at a first location, and wherein a second region, of the plurality of regions, is configured to retain at least a portion of a battery at a second location fixed relative to the first location and such that at least a portion of the battery is located between the ground plane and the second conducting element.

2. The wireless audio device of claim 1, wherein the battery is electrically connected to the ground plane via an impedance network that comprises a maximum impedance at a resonance frequency of the antenna.

3. The wireless audio device of claim 1, wherein the second conducting element is configured to reduce detuning of the antenna by at least partially decoupling the first conducting element from the user interactions.

4. The wireless audio device of claim 1, wherein the feed element comprises a grounding tab electrically connecting the feed element to the ground plane, a tapered radio frequency (RF) feed, and an impedance matching slot.

5. The wireless audio device of claim 4, wherein the tapered RF feed is tapered to become progressively narrower as it extends toward the ground plane.

6. The wireless audio device of claim 5, wherein an end of the second conducting element nearest the first conducting element is tapered.

7. The wireless audio device of claim 1, wherein a distance between a portion of the second conducting element and the ground plane is smaller than a distance between the first conducting element and the ground plane.

8. The wireless audio device of claim 1, wherein:

the first region defines a first space that conforms to a shape of at least a portion of the radiative component of the antenna; and the second region defines a second space that conforms to a shape of at least a portion of the battery.

9. The wireless audio device of claim 1, wherein the second conducting element comprises a touch sensor, and wherein the touch sensor is configured to control, in response to at least one use interaction, at least one function of the wireless audio device.

10. The wireless audio device of claim 1, wherein the first conducting element and the second conducting element together comprise a modified V-shaped antenna.

11. An antenna comprising:

a ground plane comprising a touch sensor configured to be responsive to user interactions; and a radiative component comprising:

a grounding tab electrically connecting the antenna to the ground plane;

a broadband feed element comprising a radio frequency (RF) feed, wherein the RF feed is tapered to become progressively wider as it extends away from the ground plane; and an impedance matching slot.

12. The antenna of claim 11, further comprising a conducting segment with a front end and a back end, wherein the front end is electrically connected to the broadband feed element, and wherein the back end is tapered.

13. The antenna of claim 12, wherein an end of the touch sensor nearest the conducting segment is tapered.

14. The antenna of claim 12, wherein the ground plane comprises a first portion and a second portion, wherein the first portion comprises the touch sensor, wherein the touch sensor is located a first distance from the second portion of the ground plane, wherein the conducting segment is located a second distance from the second portion of the ground plane, and wherein the first distance is greater than the second distance.

15. The antenna of claim 11, wherein the antenna is configured to have an operating frequency between about 2.4 gigahertz to about 2.484 gigahertz.

16. An apparatus comprising:

a ground plane comprising a first conductive portion electrically connected to a second conductive portion, wherein the first conductive portion of the ground plane is located a first distance from the second conductive portion of the ground plane;

a frame configured to retain a battery to be located between the first and second conductive portions of the ground plane;

a broadband feed element; and an antenna comprising a segment with a front end and a back end, wherein the front end is electrically connected to the broadband feed element, wherein the back end is tapered, wherein the antenna is located a second distance from the first conductive portion of the ground plane, and wherein the second distance is less than the first distance.

17. The apparatus of claim 16, wherein the second conductive portion of the ground plane comprises a touch sensor responsive to user interactions.

18. The apparatus of claim 16, wherein the apparatus is configured such that the battery, when installed in the apparatus, is connected to the ground plane via an impedance network comprising a maximum impedance at a resonance frequency of the antenna.

19. The apparatus of claim 16, wherein the broadband feed element comprises a grounding tab electrically connecting the broadband feed element to the ground plane, a RF feed, and an impedance matching slot, and wherein the RF feed is tapered to become progressively wider as it extends away from the ground plane.

20. The apparatus of claim 16, wherein the apparatus comprises a wireless audio device.

* * * * *